July 7, 1931. W. C. ASTRUP 1,813,524
BALL BEARING WORM GEAR FOR ROLLER AWNINGS
Filed April 12, 1929
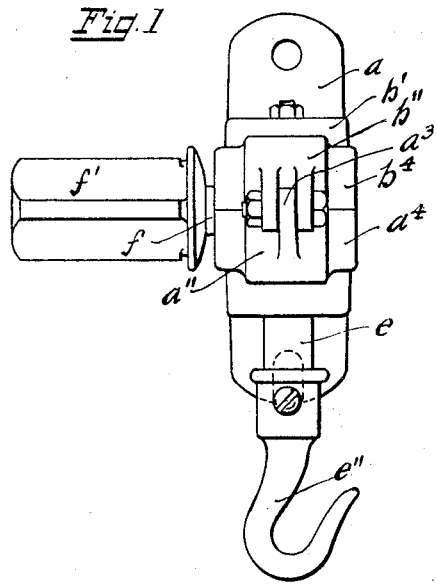
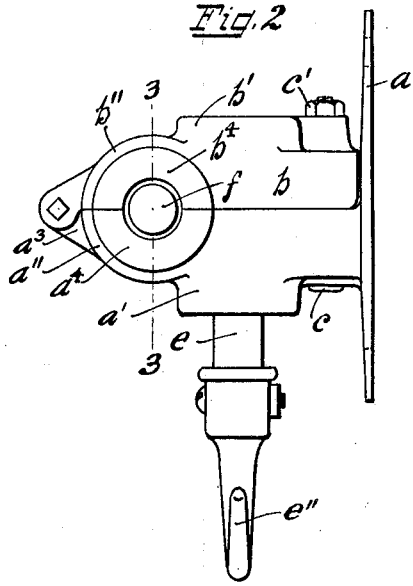
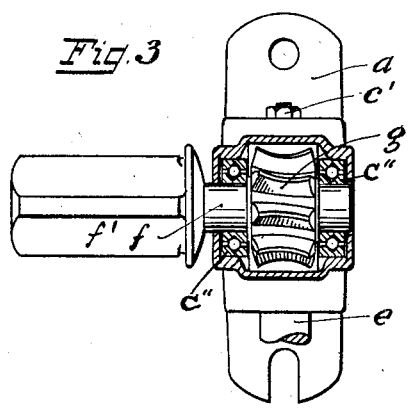
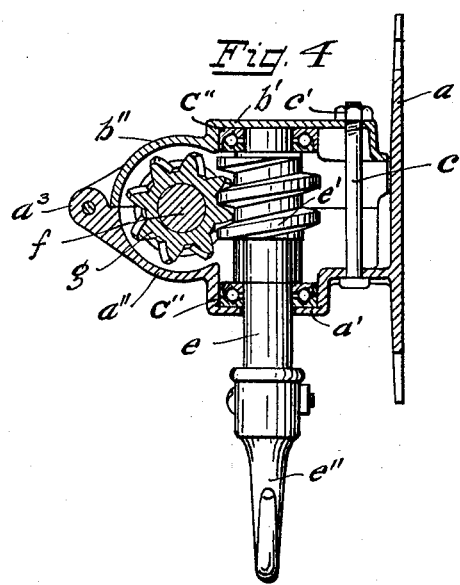
INVENTOR:-
Walter C. Astrup
BY
ATTORNEY.

Patented July 7, 1931

1,813,524

UNITED STATES PATENT OFFICE

WALTER C. ASTRUP, OF CLEVELAND, OHIO, ASSIGNOR TO THE ASTRUP COMPANY, OF CLEVELAND, OHIO, A CORPORATION OF OHIO

BALL-BEARING WORM-GEAR FOR ROLLER AWNINGS

Application filed April 12, 1929. Serial No. 354,546.

My invention relates to improvements in ball-bearing worm-gear for roller awnings, and has for its object the provision of a simple and self contained device adapted readily to operate roller awnings with minimum effort, and afford ready means for inspection and attention to its working parts without disturbing the mounting.

Larger sizes of roller awnings require the expenditure of considerable effort or power in order to operate them, and, indeed, motor mechanism has been applied to such fixtures in order to actuate roller awnings. Usually this additional expense is not warranted for normal or average installations, hence it has been my present purpose to provide operating means that will reduce the manual effort of operating the roller awning to a minimum. Accordingly, I have provided an integral bracket and hinged casing with receptacles to accommodate the same, and have mounted therein ball-bearing cases positioned with their axes at right angles to each other for reducing friction of the moving parts. Details thereof, and further explanation of the uses and advantages of my improvements will be explained in connection with the accompanying drawings, wherein:

Figure 1 is a view of the device in front elevation,

Fig. 2 is a view in side elevation,

Fig. 3 is a similar view partially broken away and sectioned on line 3—3, Fig. 2, Fig. 4 is a vertical sectional view, and Fig. 5 is a view of one of the ball cases partially broken away and in section.

Throughout the several figures of the drawings, I have employed the same character of reference to indicate similar parts.

The adjuncts of my improved worm-gear and the roller awning are so well known that it is unnecessary to illustrate and describe the same; it being sufficient to state that the device shown is designed to be mounted at the right of, and form the corresponding end bearing of a roller awning. Said device is provided with a mounting plate $a$ adapted to be bolted in place and integral with which is the recessed casing, comprising the annular recess ball support $a'$, the half casing $a''$ for the gear, and the hinge member $a^3$. The hinged portion $b$ of said casing is substantially symmetrical with the latter, affording the half casing $b''$ for the gear and the closed ball support $b'$. In addition, these separable casing members, when held together by the bolt $c$ and nut $c'$, also provide lateral half annular recess ball supports, $a^4$, $b^4$, constituting the end bearing or journal for the roller awning (not shown.)

There are four separate ball cases $c''$ required, one of which is shown in Fig. 5, comprising the inner casing $d$, affording one ball race for the balls $d'$, and the outer casing $d''$ flanged to retain the parts in unitary relation. These ball cases are mounted in sets of two each, within the respective receptacles of the fixture casing, as shown, with their axes at right angles to each other and in different planes. The worm gear member, comprising shaft $e$ mounting the worm $e'$ and the actuating hook $e''$, is disposed in the vertical axis of the appliance so that the worm operatively meshes with the worm wheel gear member $g$. Said gear, in turn, is mounted upon the horizontal shaft $f$ supported by the corresponding ball cases laterally positioned within the main casing, which shaft is integral with the spindle $f'$ supporting the roller awning, and by which it is rotated.

In practice the hinged casing $b$ is opened and the interior of the bracketed casing member is filled with heavy grease to facilitate the operation of the worm-gear. It will be seen that the hinged member may thus be opened for inspection, greasing, and the like, without disturbing the awning mounting, merely by removing the inner bolt, yet the parts are fully protected with the casing closed, as shown.

A heavy awning may be provided with the well known intermediate roller supports and with an opposing end bearing of ball-bearing type, if desired, although the principal friction coefficient is met with in the worm-gear and support. However, in accordance with the instant improvement the friction resulting from the end thrust of the worm is minimized by the horizontally positioned ball cases in the vertical axis of the appliance, while the rotating friction likewise is minimized by the ball cases forming the end bearing for the roller awning in the horizontal axis of the appliance. Accordingly, roller awnings equipped with my invention may be operated manually with greater ease, and of much larger size, than previously has been found practicable. It will be understood that the usual hooked shaft of the desired length is applied to hook $e''$ to form a universal joint, and said shaft and the thus connected appliance are rotated readily by hand to raise or lower the associated roller awning.

Having now described particularly the structural features and purposes of my instant invention, I claim as new and desire to secure by Letters Patent, the following:

A separable actuating support for roller awnings, comprising a casing, the casing being composed of separable half sections, a mounting plate for one of the half sections, each section having an annular recess and two half annular recesses in the walls thereof, friction-reducing bearings mounted in the recesses, a shaft journaled in the annular recess bearings, a second shaft journaled in the half annular recess bearings, the axes of the shafts being at right angles with each other and in different planes, a worm gear on said first mentioned shaft, a worm wheel on said second shaft meshing with the worm gear, and means securing the half sections together, whereby access can be had to said bearings, shafts and gears upon separation of the half sections without disturbing a roller awning supported by said second shaft.

In testimony whereof I do now affix my signature.

WALTER C. ASTRUP.